United States Patent
Mueck

(10) Patent No.: US 10,445,119 B2
(45) Date of Patent: Oct. 15, 2019

(54) SOFTWARE RECONFIGURABLE MOBILE DEVICES AND METHODS

(71) Applicant: INTEL IP Corporation, Santa Clara, CA (US)

(72) Inventor: Markus Dominik Mueck, Unterhaching (DE)

(73) Assignee: INTEL CORPORATION, Santa Clara, CA (US)

( * ) Notice: Subject to any disclaimer, the term of this patent is extended or adjusted under 35 U.S.C. 154(b) by 146 days.

(21) Appl. No.: 15/638,931

(22) Filed: Jun. 30, 2017

(65) Prior Publication Data
US 2019/0004834 A1    Jan. 3, 2019

(51) Int. Cl.
*G06F 9/455* (2018.01)
*G06F 8/41* (2018.01)

(52) U.S. Cl.
CPC .......... *G06F 9/45533* (2013.01); *G06F 8/447* (2013.01); *G06F 9/45504* (2013.01); *G06F 9/45508* (2013.01)

(58) Field of Classification Search
CPC ........................ G06F 9/45533; G06F 9/45504
See application file for complete search history.

(56) References Cited

U.S. PATENT DOCUMENTS

| | | | | |
|---|---|---|---|---|
| 9,612,816 B2 * | 4/2017 | Choi | ........................ | G06F 8/654 |
| 10,256,847 B2 * | 4/2019 | Choi | ...................... | H04B 1/001 |
| 2006/0190813 A1 * | 8/2006 | Neil | ........................ | G06F 9/445 |
| | | | | 715/202 |
| 2015/0178112 A1 * | 6/2015 | Ivanov | ................ | G06F 9/45504 |
| | | | | 718/1 |
| 2015/0207680 A1 * | 7/2015 | Ivanov | ..................... | H04B 1/40 |
| | | | | 455/73 |
| 2015/0244400 A1 * | 8/2015 | Mueck | ................. | H04B 1/0057 |
| | | | | 455/77 |
| 2015/0326434 A1 * | 11/2015 | Choi | ........................ | G06F 8/61 |
| | | | | 709/221 |
| 2016/0198018 A1 * | 7/2016 | Choi | ...................... | H04W 8/22 |
| | | | | 370/329 |

(Continued)

OTHER PUBLICATIONS

"Reconfigurable Radio Systems (RRS); Radio Reconfiguration Related Architecture for Mobile Devices", Feb. 2015, 42 pages, Draft ETSI EN 303 095, V1.2.1.

(Continued)

*Primary Examiner* — Adam Lee
(74) *Attorney, Agent, or Firm* — Finch & Maloney PLLC

(57) ABSTRACT

Systems and methods that adapt software components encoded for execution by a virtual machine to the specific architecture of a target platform are provided. These systems and methods combine the portability benefits of a virtual machine architecture with the power conservation and computation efficiency benefits normally associated with native implementations. More particularly, in some embodiments, a compiler configured to compile software components encoded for execution by a virtual machine is enhanced to identify hardware processing elements available on a target platform and to adapt the software components to utilize the identified hardware processing elements. In at least one embodiment, the adaptation performed by the enhanced compiler takes the form of compression or extension.

26 Claims, 9 Drawing Sheets

(56) References Cited

U.S. PATENT DOCUMENTS

2017/0064562 A1\* 3/2017 Jacobson ............. H04W 48/16
2017/0147314 A1\* 5/2017 Choi ........................ G06F 8/61
2017/0273068 A1\* 9/2017 Choi ..................... H04B 1/001
2019/0007811 A1\* 1/2019 Choi ...................... H04W 4/50
2019/0089386 A1\* 3/2019 Choi ..................... G06F 9/455

OTHER PUBLICATIONS

"Reconfigurable Radio Systems (RRS); Mobile Device (MD) Information Models and Protocols; Part 4: Radio Programming Interface (RPI)", ETSI, Jan. 2017, 38 pages, Draft EN 303 146-4, V1.1.1.
Vladimir Ivanov et al., "Radio Virtual Machine", ETSI Workshop on Future Radio Technologies—Air Interfaces, Jan. 27-28, 2016, 10 pages.

\* cited by examiner

SOFTWARE RECONFIGURABLE MOBILE DEVICES AND METHODS

BACKGROUND

Virtualization of hardware often involves tradeoffs between portability and performance. This principle is illustrated, for example, in the use of middleware to interpret and execute generic code on multiple hardware platforms. While using such middleware offers certain advantages, the middleware itself consumes computing resources offered by the hardware platforms, thereby decreasing overall system performance. For example, software developed to comply with the Software Communications Architecture (SCA) for a software defined radio suffers from this disadvantage. More particularly, within the context of the SCA, middleware introduces computational complexity and consumes substantial amounts of power.

DETAILED DESCRIPTION

Figure 1:
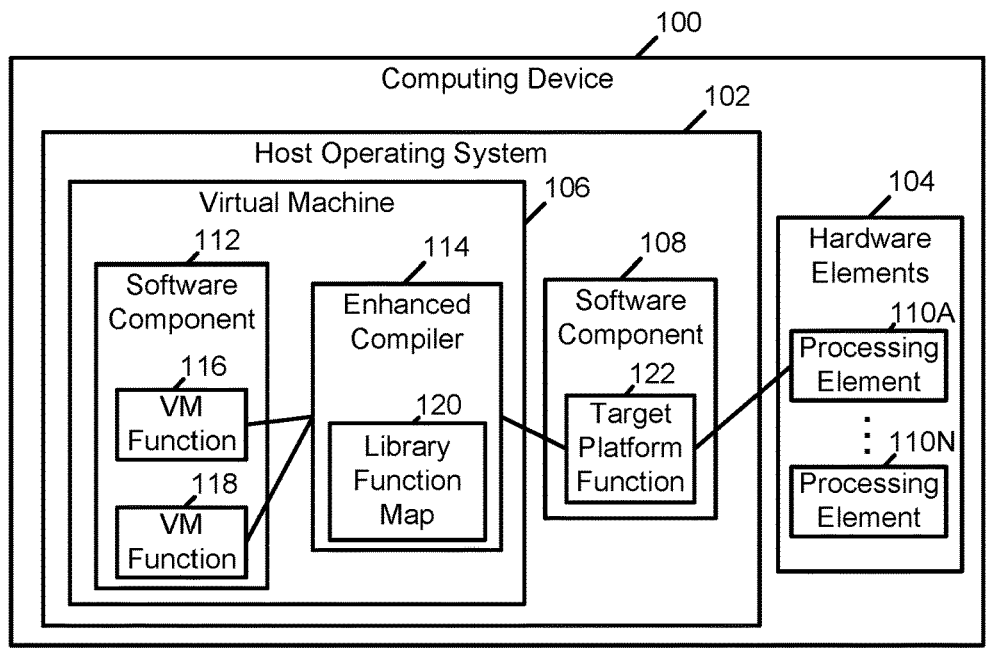
FIG. 1 is a block diagram illustrating a computing device including an enhanced compiler configured in accordance with an embodiment of the present disclosure.

The systems and methods disclosed herein receive software components encoded for execution by a virtual machine and adapt these software components to the specific architecture of a target platform. In so doing, the systems and methods disclosed herein combine the portability benefits of a virtual machine architecture with the power conservation and computation efficiency benefits normally associated with native implementations.

More particularly, some embodiments include an enhanced compiler. This enhanced compiler is configured to compile software components encoded for execution by a virtual machine. The enhanced compiler is also configured to identify hardware processing elements available on a target platform and to adapt the software components to utilize the identified hardware processing elements. In at least one embodiment, the adaptation performed by the enhanced compiler takes the form of software component compression and/or software component extension.

For example, in some embodiments, the enhanced compiler is configured to compress a software component where the software component calls virtual machine (VM) functions that fail to utilize efficient hardware available in the target platform for a given task. For instance, where a target platform includes a hardware accelerator to calculate a particular value, but the software component calls VM functions that utilize general purpose hardware (or suboptimal special purpose hardware) rather than the hardware accelerator, the enhanced compiler may replace the VM functions with a target platform function that utilizes the hardware accelerator.

In other embodiments, the enhanced compiler is configured to extent a software component where, to perform a task, the software component calls a VM function that is not directly supported by the target platform. For example, where the target platform includes hardware accelerators that collectively can perform the task, the enhanced compiler may replace the unsupported VM function call with one or more target platform functions that utilize hardware accelerators installed in the target platform.

Some embodiments disclosed herein use compression and extension in conjunction with virtual machines that control radio hardware components. Computing devices that include radio hardware components may be referred to wherein as "radio computers" and the virtual machines used to control the radio computers may be referred to herein as "radio virtual machines (RVMs)." In some embodiments directed to radio computers, the enhanced compiler leverages the hierarchical nature of RVMs to extend and/or compress radio application components encoded for execution on the RVMs. More specifically, in these embodiments, the enhanced compiler is configured to access and traverse an RVM hierarchy data structure (e.g., function block map as described further below with reference to FIG. 7) that organizes target platform function blocks (FBs) and/or abstract processing elements (APEs) of the RVM by function and level. Within this hierarchy, target platform FBs/APEs that can execute the same function are associated with one another, with higher level target platform FBs/APEs being associated with more computationally efficient hardware processing elements than lower level target platform FBs/APEs. In these embodiments, the enhanced compiler navigates to higher levels within the function block map to compress radio application components and navigates to lower levels within the function block map to extent radio application components. In the case of either compression or extension, the enhanced compiler searches for target platform FBs/APEs that are supported by the target hardware platform.

More specifically, in some embodiments, the enhanced compiler extends radio application components configured to utilize a hardware accelerator accessed at a relatively high level within the RVM hierarchy. In these embodiments, the enhanced compiler extends a radio application component by adapting it to utilize hardware accelerators accessed at lower levels within the RVM hierarchy. These lower level hardware accelerators are configured to collectively complete a task to which the high level hardware accelerator was directed. Extension of the radio application component can be useful to, for example, enable the radio application component to execute on a target platform that does not have the high level hardware accelerator installed but does have the lower level hardware accelerators installed.

Also, in some embodiments, the enhanced compiler compresses radio application components configured to utilize hardware accelerators accessed at a relatively low level within the RVM hierarchy. In these embodiments, the enhanced compiler compresses a radio application component by adapting it to utilize a hardware accelerator accessed at higher level within the RVM hierarchy. The higher level hardware accelerator is configured to complete a task to which the low level hardware accelerators are directed. Compression of the radio application component can be useful to, for example, enable the radio application component to execute on a target platform that includes the higher level hardware accelerator in addition to, or as an alternative to, the low level hardware accelerators.

Still other aspects, embodiments and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. References to "an embodiment," "other embodiments," "an example," "some embodiments," "some examples," "an alternate embodiment," "various embodiments," "one embodiment," "at least one embodiment," "another embodiment," "this and other embodiments" or the like are not necessarily mutually exclusive and are intended to indicate that a particular feature, structure, or characteristic described in connection with the embodiment or example may be included in at least one embodiment or example. The appearances of such terms herein are not necessarily all referring to the same embodiment or example. Any embodiment or example disclosed herein may be combined with any other embodiment or example.

Also, the phraseology and terminology used herein is for the purpose of description and should not be regarded as limiting. Any references to examples, embodiments, components, elements, or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

General Overview

As explained above, conventional techniques of hardware virtualization that involve utilizing middleware result in an overall system that is computationally inefficient and power hungry. Thus, and in accordance with at least some embodiments disclosed herein, a computing device implements an enhanced compiler that adapts software components encoded for execution by a virtual machine to utilize target platform specific functions. These target platform specific functions execute specialized and efficient hardware processing elements available in the target platform, thereby increasing overall system performance and/or decreasing power consumption.

System Architecture on a Computing Device

FIG. 1 illustrates a computing device 100 including one or more hardware elements 104. As shown in FIG. 1, the one or more hardware elements 104 include processing elements 110A through 110N. In some embodiments, each processing element of the processing elements 110A through 110N includes one or more processors, controllers, microcontroller, field programmable gate arrays, application specific integrated circuits, hardware accelerators, digital signal processors, and/or other hardware processing elements that receive input data and manipulate the input data to generate output data. In other embodiments, each processing element of the processing elements 110A through 110N includes physical memory. This physical memory may incorporate volatile and/or non-volatile data storage (e.g., read-only memory, random access memory, flash memory, magnetic/optical disk, and/or some other computer readable and writable medium) that is readable and/or writable by one or more hardware processing elements. In some embodiments, the physical memory is sized and configured to store programs executable by the hardware processing elements and at least some of the data used by the programs during execution. Additional aspects and components of the one or more hardware elements 104 included in the computing device 100 are described further below with reference to FIG. 10.

As shown in FIG. 1, the one or more hardware elements 104 are configured to implement a host operating system 102. In some embodiments, the host operating system 102 is configured to abstract and control the hardware elements 104 to support execution of programs such as a virtual machine 106. For example, the host operating system 102 may include a hypervisor configured to implement the virtual machine 106. The virtual machine 106 may be, for example, a Java virtual machine, a RVM (e.g., a virtual machine with the ability to alter radio functions of a target platform), or any other of a variety of virtual machines known in the art. As also shown in FIG. 1, the host operating system 102 is configured to support execution of the executable software component 108, which includes a target platform function 122.

In some embodiments, the virtual machine 106 is configured to receive and process a software component 112 that includes generic, VM functions, such as the VM functions 116 and 118. As shown in FIG. 1, the software component 112 is encoded using a standard that the virtual machine 106 and its components, such as an enhanced compiler 114, are configured to parse. For example, the software component 112 may be encoded as human readable source code and/or some form of intermediate code specific to the virtual machine 106.

As shown in FIG. 1, the enhanced compiler 114 includes a library function map 120 and is configured to compile and/or link the software component 112 to generate the executable software component 108. When executing according to this configuration in some embodiments, the enhanced compiler 114 examines the VM functions 116 and 118 to determine whether the VM functions 116 and 118 may be adapted for more efficient execution by the particular hardware elements 104 installed within the computing device 100. This examination may include searching the library function map 120 to identify associations between one or more of the VM functions 116 and 118 and one or more target platform functions, such as the target platform function 122. In some embodiments, these target platform functions are configured for efficient execution by one or more of the processing elements 110A through 110N.

In some embodiments illustrated by FIG. 1, the library function map 120 may take the form of a look-up table, a mapping function, or some other form of cross-reference. For instance, in at least one embodiment, the library function map 120 is a look-up table with fields that specify one or more VM functions that are associated with, and that can be mapped to, one or more target platform functions. The library function map 120 may further include fields that indicate whether an association is preferred (e.g., for enhanced performance) over other associations; whether the association calls for a direct mapping, a compression, or an extension; and/or rules required to properly manipulate arguments of VM functions when executing a direct mapping, a compression, or an extension. Example mapping processes executed by the enhanced compiler 114 are more fully described below and with reference to FIG. 4.

Regardless of the form of the library function map 120, where the enhanced compiler 114 finds an association between one or more VM functions and one or more target platform functions, the enhanced compiler 114 replaces the one or more VM functions with the one or more target platform functions. Depending on the particular associations between the one or more VM functions and the one or more target platform functions, this replacement process may include extension and/or compression of the one or more VM functions.

More particularly, where the enhanced compiler 114 identifies associations between 2 or more VM functions and a fewer number of target platform functions that call for compression, the enhanced compiler 114 compresses the VM functions into a fewer number of target platform functions. This compression process may include combining one or more of the VM function arguments to generate arguments for the target platform functions, although the specific argument manipulations required will depend on the particular implementation of the VM functions and the target platform functions. Rules regarding these argument manipulations may be stored, for example, within fields of the library function map 120.

Conversely, where the enhanced compiler 114 identifies associations between a one or more VM functions and a larger number of target platform functions that call for extension, the enhanced compiler 114 extends the one or more VM functions into the larger number of target platform functions. This extension process may include segmenting one or more of the VM function arguments to generate arguments for the target platform functions, although the specific argument manipulations required will depend on the particular implementation of the VM functions and the target platform functions. Rules regarding these argument manipulations may be stored, for example, within fields of the library function map 120.

As illustrated in FIG. 1, the library function map 120 includes associations that call for compression of the VM functions 116 and 118 into the target platform function 122. When executing a compilation process according to its configuration, the enhanced compiler 114 identifies the compression association and, in response, generates the executable software component 108 to include the target platform function 122.

As shown in FIG. 1, the target platform function 122 is associated with and executed by the processing element 110A. In some embodiments, the processing element 110A is a hardware processing element that is specially configured to execute the target platform function 122. In these embodiments, the processing element 110A is able to execute the target platform function 122 more efficiently and using less power than in embodiments where the processing element 110A is a more generalized hardware processing element (e.g., able to execute the target platform function 122 and additional functions).

To illustrate further, in one example in accordance with FIG. 1, the VM functions 116 and 118 are each butterfly functions that, in combination, are configured to calculate a Fast Fourier Transform (FFT). Further, in this example, the processing element 110A is a hardware accelerator that is configured to directly calculate an FFT when executing the target platform function 122. Thus, by compressing the VM functions 116 and 118 into the target platform function 122, the enhanced compiler 114 tailors the software component 112 for enhanced execution on the computing device 100. In some embodiments, a similar approach may be applied to any other function on Layer 1 (Physical Layer), Layer 2 (Medium Access Control Layer), or any other Layer up to the Application Layer. For Layer 1, further examples may include Forward Error Correction encoding/decoding (including Convolutional Codes, Turbo Codes, Low Density Parity Check (LDPC) codes, fountain codes, polar codes, etc.), MIMO (Multiple inputs/Multiple Outputs) processing (e.g., in the context of multiple transmit and/or receive antennas) in the transmitter and/or receiver, constellation mapping/demapping (e.g., BPSK, QPSK, QAM-16, QAM-64, QAM-128, QAM-256, QAM-512, QAM-1024, QAM-2048, etc.), interleaving, channel equalization in the receiver, etc. Higher layer processing may include data encryption/decryption, routing, packet inspection, etc.

Figure 2:
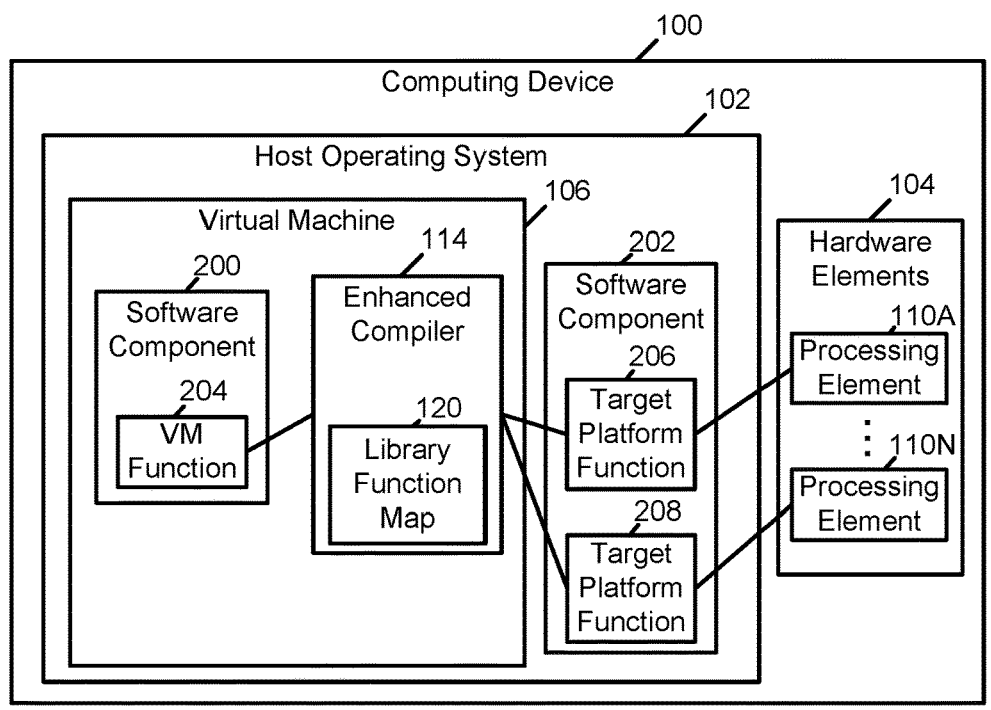
FIG. 2 is another block diagram illustrating the computing device of FIG. 1 including the enhanced compiled and configured in accordance with an embodiment of the present disclosure.

FIG. 2 illustrates an example of the computing device 100 that includes a software component 200 within the virtual machine 106. The software component 200 includes a VM function 204. In this example, the library function map 120 includes an association that calls for extension of the VM function 204 into target platform functions 206 and 208. When executing a compilation process according to its configuration, the enhanced compiler 114 identifies the extension association and, in response, generates the executable software component 202 to include the target platform functions 206 and 208.

As shown in FIG. 2, the target platform functions 206 and 208 are respectively associated with and executed by the processing elements 110A and 110N. In some embodiments, the processing elements 110A and 110N are hardware processing elements that are specially and respectively configured to execute the target platform functions 206 and 208. In these embodiments, the processing elements 110A and 110N are able to execute the respective target platform functions 206 and 208 more efficiently and using less power than in embodiments where the processing elements 110A and 110N are a more generalized hardware processing elements (e.g., able to execute the respective target platform functions 206 and 208 and additional functions).

To illustrate further, in one example in accordance with FIG. 2, the VM function 204 is an FFT function. Further, in this example, the processing elements 110A and 110N are a hardware accelerators that are configured to calculate butterfly values when respectively executing the target platform functions 206 and 208. Thus, by extending the VM function 204 into the target platform functions 206 and 208, the enhanced compiler 114 tailors the software component 200 for enhanced execution on the computing device 100. This enhanced execution may take the form of increased efficiency (e.g., where the processing elements 110A and 110N can more efficiently calculate butterfly values than a general purpose hardware processing element). Alternatively, the enhanced execution may take the form of simply being able to calculate the FFT at all (e.g. where the hardware elements 104 are unable to calculate an FFT directly). For instance, where there are no specific hardware accelerators are installed in the target platform, the enhanced compiler 114 may extend the VM function 204 down to target platform functions that execute "atomic operations", i.e. the most basic operations such as additions, subtractions, multiplications, etc. In some embodiments, a similar approach may be applied to any other function on Layer 1 (Physical Layer), Layer 2 (Medium Access Control Layer), or any other Layer up to the Application Layer. For Layer 1, further examples may include Forward Error Correction encoding/decoding (including Convolutional Codes, Turbo Codes, Low Density Parity Check (LDPC) codes, fountain codes, polar codes, etc.), MIMO (Multiple inputs/Multiple Outputs) processing (e.g., in the context of multiple transmit and/or receive antennas) in the transmitter and/or receiver, constellation mapping/demapping (e.g., BPSK, QPSK, QAM-16, QAM-64, QAM-128, QAM-256, QAM-512, QAM-1024, QAM-2048, etc.), interleaving, channel equalization in the receiver, etc. Higher layer processing may include data encryption/decryption, routing, packet inspection, etc.

Figure 3:
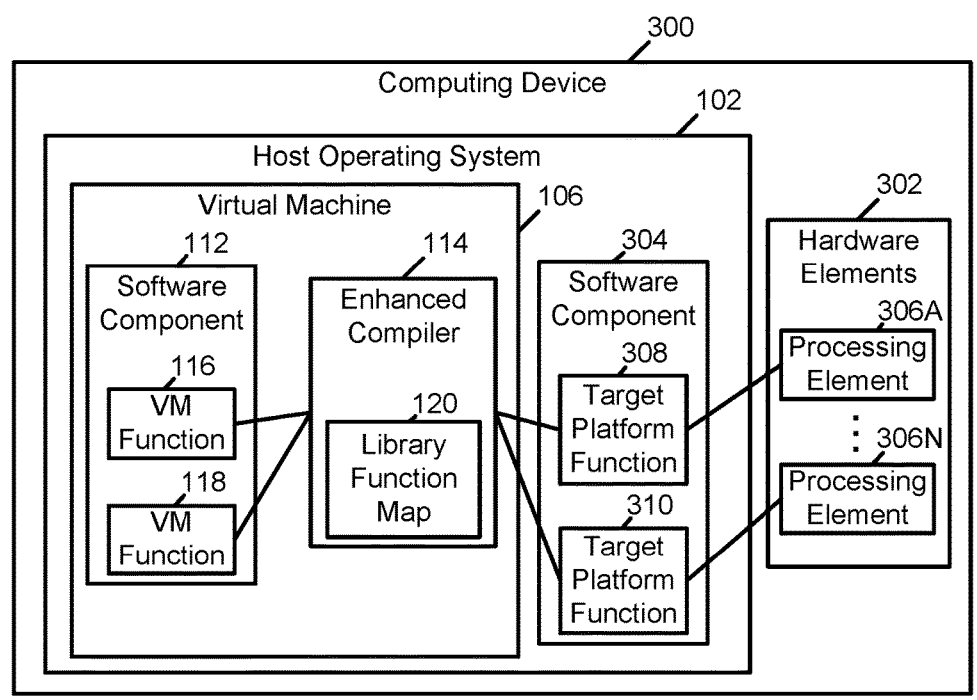
FIG. 3 is a block diagram illustrating another computing device including the enhanced compiler of FIG. 1 and configured in accordance with an embodiment of the present disclosure.

FIG. 3 illustrates a computing device 300 including one or more hardware elements 302. As shown in FIG. 3, the one or more hardware elements 302 include processing elements 306A through 306N, which are configured to implement the host operating system 102. The processing elements 306A through 306N may include hardware processing elements and/or physical memory similar to the processing elements 110A through 110N described above with reference to FIG. 1.

In one example illustrated by FIG. 3, the library function map 120 includes associations that call for direct mapping of the VM functions 116 and 118 to the target platform functions 308 and 310. When executing a compilation process according to its configuration, the enhanced compiler 114 identifies the direct mapping associations and, in response, generates the executable software component 304 to include the target platform functions 308 and 310.

As shown in FIG. 3, the target platform functions 308 and 310 are respectively associated with and executed by the processing elements 306A and 306N. In some embodiments, the processing elements 306A and 306N are hardware processing elements that are specially and respectively configured to execute the target platform functions 308 and 310. In these embodiments, the processing elements 306A and 306N are able to execute the respective target platform functions 308 and 310 more efficiently and using less power than in embodiments where the processing elements 306A and 306N are a more generalized hardware processing elements (e.g., able to execute the respective target platform functions 308 and 310 and additional functions).

To illustrate further, in one example in accordance with FIG. 3, the VM functions 116 and 118 are each butterfly functions that, in combination, are configured to calculate an FFT. Further, in this example, the processing elements 306A and 306N are a hardware accelerators that are configured to calculate butterfly values when respectively executing the target platform functions 308 and 310. Thus, by directly mapping the VM functions 116 and 118 to the target platform functions 308 and 310, the enhanced compiler 114 tailors the software component 112 for enhanced execution on the computing device 300.

Methodology for a Computing Device

Figure 4:
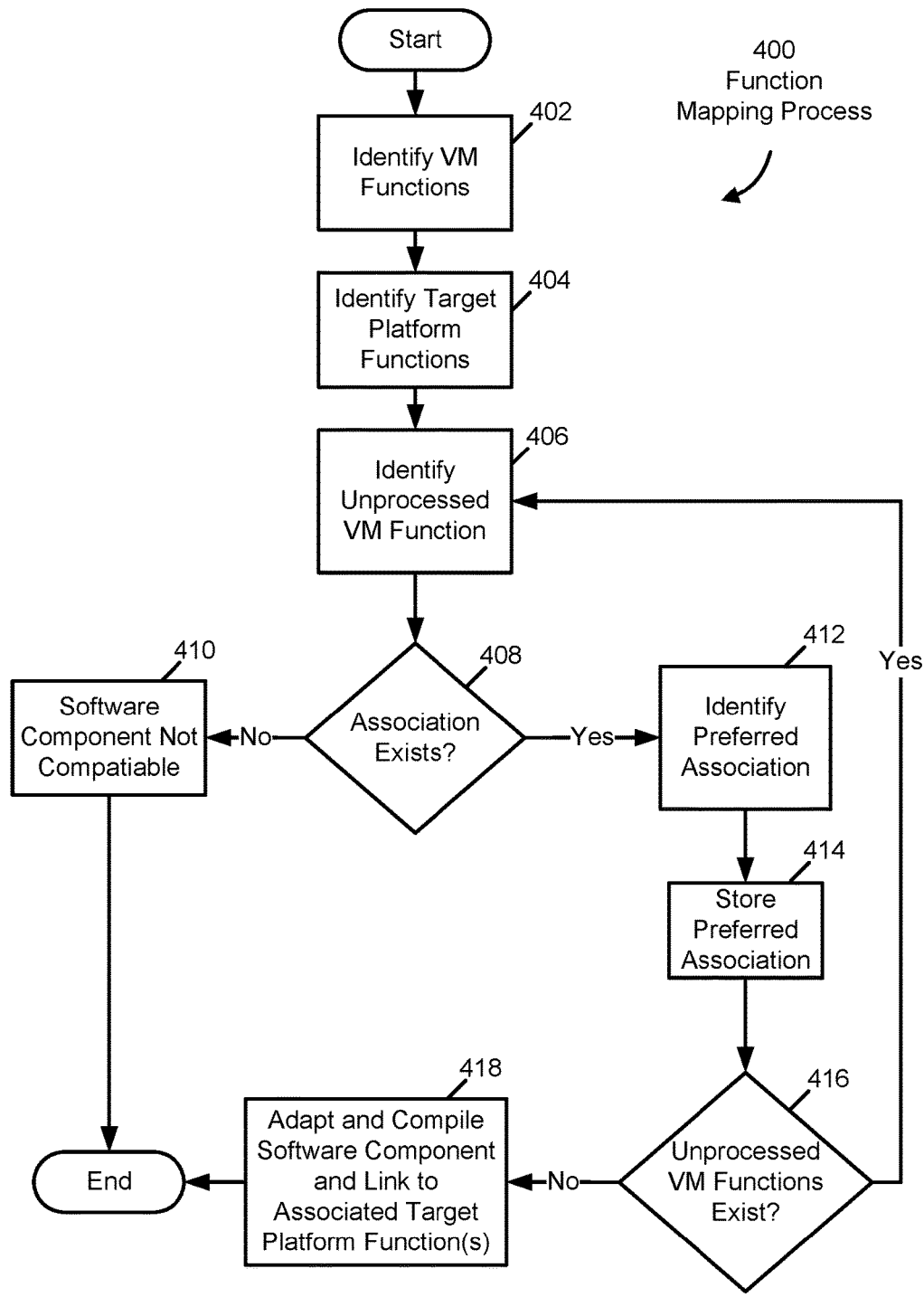
FIG. 4 is a flow chart illustrating a function mapping process in accordance with an embodiment of the present disclosure.

Some embodiments disclosed herein execute a function mapping process, such as the function mapping process 400 illustrated in FIG. 4. The function mapping process 400 may be executed by an enhanced compiler, such as the enhanced compiler 114 described above with reference to FIGS. 1-3. The function mapping process 400 may be executed as part of an overall compilation process designed to create an executable software component for a target hardware platform. The acts executed by the function mapping process 400 collectively generate executable code that is tailored to the target hardware platform of a target computing device. This tailored executable code is more efficiently executed by the target computing device than, for example, code executed via middleware.

As illustrated in FIG. 4, the function mapping process 400 starts in act 402 with the enhanced compiler identifying a set of VM functions (e.g., the VM functions 116 and 118) included within a software component (e.g., the software component 112). In some embodiments, the enhanced compiler identifies the set of VM functions by parsing and making a pass through the code of the software component.

In act 404, the enhanced compiler identifies a set of target platform functions available for execution on the target computing device. In some embodiments, the enhanced compiler accesses a system library associated with the target computing device to identify the available set of target platform functions.

In act 406, the enhanced compiler identifies the next, unprocessed VM function from the set of VM functions identified in the act 402 above. In act 408, the enhanced compiler determines whether one or more associations between the identified VM function and a target platform function (e.g., the target platform function 122) exist in a library function map (e.g., the library function map 120). If so, the enhanced compiler executes act 412. Otherwise, the enhanced compiler executes act 410.

In the act 410, the enhanced compiler determines that the software component being compiled is not compatible with the target platform due to lack of support for the identified VM function, and the function mapping process 400 ends.

In the act 412, the enhanced compiler identifies a preferred association within the library function map that involves the identified VM function. For example, where the library function map includes multiple associations between the identified VM function and target platform functions, the enhanced compiler identifies the preferred association by referencing the fields within the library function map that store preference information. Alternatively, where the library function map includes only one association involving the VM function, the enhanced compiler identifies that association as the preferred association.

In act 414, the enhanced compiler stores the preferred association identified in the act 412 for subsequent processing in act 418. In act 416, the enhanced compiler determines whether unprocessed members of the set of VM functions identified in the act 402 exist. If so, the enhanced compiler executes the act 406 to identify the next unprocessed member. Otherwise, the enhance compiler executes the act 418.

In the act 418, the enhanced compiler adapts and compiles the software component and links a set of associated target platform functions to the software component. More specifically, where an association calls for a direct mapping between a VM function and a target platform function, the enhanced compiler adapts the software component to call the target platform function in place of the VM function. Where an association calls for compression of multiple VM functions into a target platform function, the enhanced compiler adapts the software component to call the target platform function in place of the multiple VM functions. Where an association call for extension of a VM function into multiple target platform functions, the enhanced compiler adapts the software component to call the multiple target platform functions in place of the VM function. These adaptations may include replacement of the VM function(s) with the target platform function(s). After execution of the act 418, the function mapping process 400 ends.

Process 400 depicts one particular sequence of acts in a particular example. The acts included in these processes may be performed by, or using, one or more computing devices specially configured as discussed herein. Some acts are optional and, as such, may be omitted in accord with one or more examples. Additionally, the order of acts can be altered, or other acts can be added, without departing from the scope of the systems and methods discussed herein.

System Architecture on a Radio Computer

As described above, some embodiments disclosed herein are directed to a radio computer. A radio computer can incorporate any of a variety of radio access technologies that are operated simultaneously and/or independently. For instance, any of the radio links used in a radio computer may operate according to any one or more of the following radio communication technologies and/or standards: Global System for Mobile Communications (GSM) radio communication technology, General Packet Radio Service (GPRS) radio communication technology, Enhanced Data Rates for GSM Evolution (EDGE) radio communication technology, and/or Third Generation Partnership Project (3GPP) radio communication technology, examples of which include Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, etc.

In addition, radio computers as described herein can employ any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies). Applicable spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc). It is appreciated that some bands are limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, radio computers can use bands such as the TV White Space bands (typically below 790 MHz) where in particular the 400 MHz and 700 MHz bands are promising candidates.

Radio computers can also implement a hierarchical mode of communication, for example by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc. Radio computer can also use different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

Figure 5:
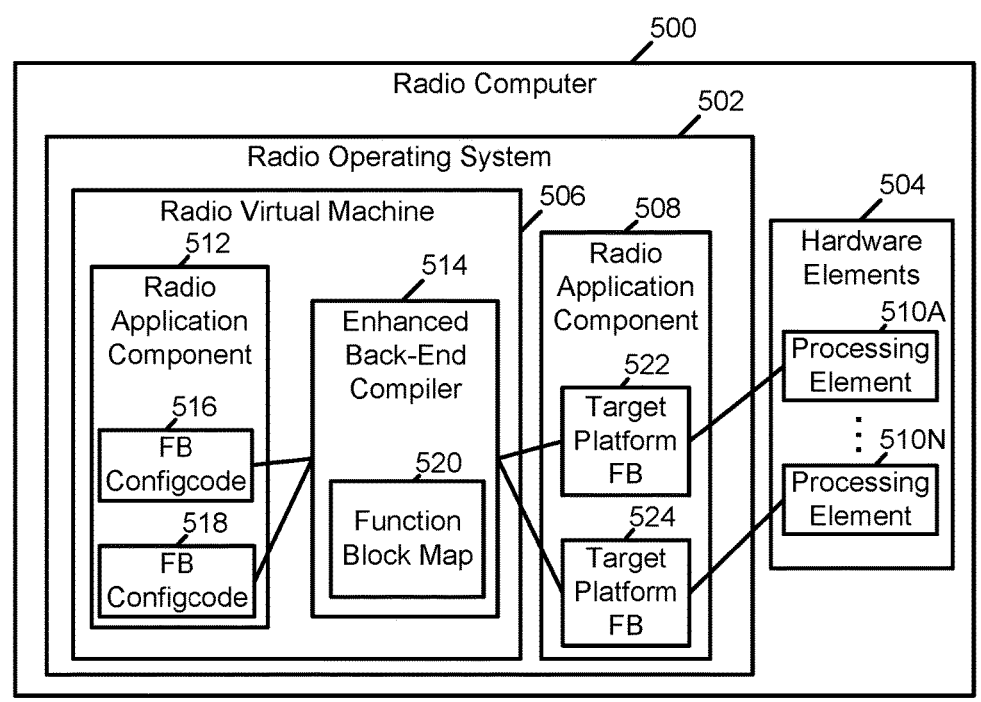
FIG. 5 is a block diagram illustrating a radio computer including an enhanced back-end compiler configured in accordance with an embodiment of the present disclosure.

FIG. 5 illustrates a radio computer 500 including one or more hardware elements 504. As shown in FIG. 5, the one or more hardware elements 504 include processing elements 510A through 510N. The processing elements 510A through 510N may include hardware processing elements and/or physical memory similar to the processing elements 110A through 110N described above with reference to FIG. 1. The processing elements 510A through 510N may further include hardware processing elements that control operation of radio components, such as transceivers and other telecommunications circuitry.

As shown in FIG. 5, the one or more hardware elements 504 are configured to implement a radio operating system 502. In some embodiments, the radio operating system 502 is configured to abstract and control the hardware elements 504 to support execution of radio programs such as a radio virtual machine 506. As also shown in FIG. 5, the radio operating system 502 is configured to support execution of the radio application component 508, which includes function blocks 522 and 524.

In some embodiments, the radio virtual machine 506 is configured to receive and process a radio component 512 of a radio application. This radio application component 512 includes FB configcode elements, such as the FB configcode elements 516 and 518. As shown in FIG. 5, the radio application component 512 is encoded using a standard that the radio virtual machine 506 and its components, such as an enhanced back-end compiler 514, are configured to parse. For example, the radio application component 512 may be encoded as human readable source code, an intermediate representation, executable code, and the like. As shown in FIG. 5, the enhanced back-end compiler 514 includes a function block map 520.

Figure 6:
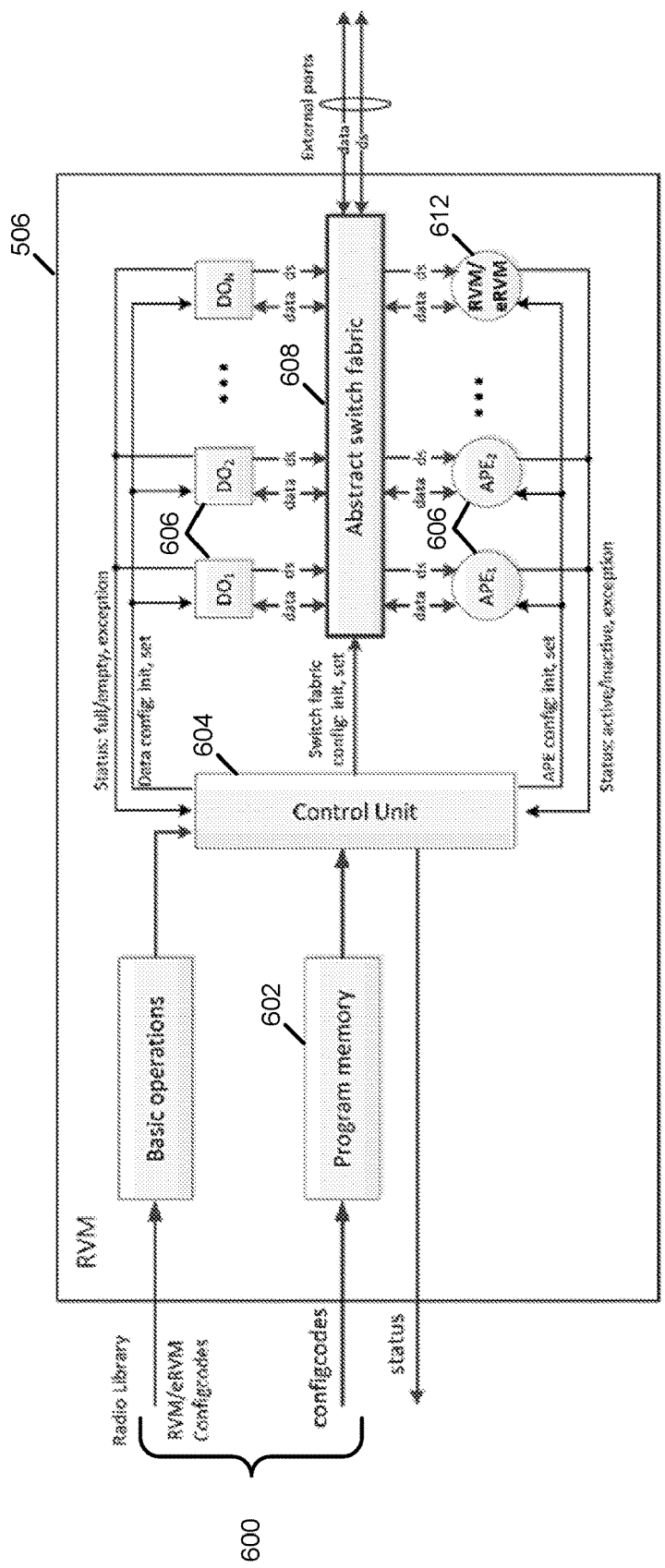
FIG. 6 is a block diagram of a radio virtual machine that may implement various function mapping and compilation processes in accordance with some embodiments of the present disclosure.

FIG. 6 illustrates portions of the radio virtual machine 506 in greater detail. As shown in FIG. 6, the primary components of the radio virtual machine include configcodes 600, program memory 602, a control unit 604, data objects 606, abstract switch fabric 608, abstract processing elements (APEs) 610, and lower level instances of the radio virtual machine 612. The program memory 602 receives and stores configcodes for use by the control unit 604. The control unit 604 executes the configcodes to configure the data objects 606, abstract switch fabric 608, the APEs 610, and the lower level radio virtual machines 612 for operation. The APEs 610 abstract hardware processing elements, such as the processing elements 510A through 510N, thus enabling portability of the configcodes directed to the control of the processing elements 510A through 510N. Detailed descriptions of these components can be found within the ETSI EN 303 146-4 V1.1.1 standard published January 2017.

Returning to FIG. 5, the enhanced back-end compiler 514 is configured to compile and/or link the radio application component 512 to generate the executable radio application component 508. When executing according to this configuration in some embodiments, the enhanced back-end compiler 514 examines the FB configcode elements 516 and 518 to determine whether the FB configcode elements 516 and 518 may be adapted for more efficient execution by the particular hardware elements 504 installed within the radio computer 500. This examination may include identifying APEs of the radio virtual machine that are configured to execute the function blocks defined in the FB configcode elements 516 and 518; determining whether the function blocks map directly to APEs; and, if not, whether compression or extension of the function blocks is possible. In some embodiments, the enhanced back-end compiler 514 is also configured to compress and/or extend the function blocks where direct mapping is not available. Compression and extension processes executed by the enhanced back-end compiler 514 in some embodiments will be more fully described below with reference to FIGS. 8 and 9.

In some embodiments, the enhanced back-end compiler 514 references the function block map 520 when executing compression and extension processes. The function block map 520 may take the form of a look-up table, a mapping function, or some other form of cross-reference. For instance, in at least one embodiment, the function block map 520, is a hierarchical representation of the radio application component 512 that the enhanced back-end compiler 514 generates by examining the radio application component 512. A more detailed example of a function block map 700 is described further below with reference to FIG. 7.

In one example illustrated by FIG. 5, the enhanced back-end compiler determines that the function blocks defined in the FB configcode elements 516 and 518 map directly to APEs associated with hardware processing elements 510A and 510N. When executing a compilation process according to its configuration, the enhanced back-end compiler 514, in response to this determination, generates the executable software component 508 to include the target platform FBs 522 and 524, which are executed respectively by the hardware processing elements 510A and 510N.

As shown in FIG. 5, the target platform FBs 522 and 524 are respectively associated with and executed by the processing elements 510A and 510N. In some embodiments, the processing elements 510A and 510N are hardware processing elements that are specially and respectively configured to execute the target platform functions 522 and 524. In these embodiments, the processing elements 510A and 510N are able to execute the respective target platform functions 522 and 524 more efficiently and using less power than in embodiments where the processing elements 510A and 510N are a more generalized hardware processing elements (e.g., able to execute the respective target platform FBs 522 and 524 and additional FBs).

To illustrate further, in one example in accordance with FIG. 5, the FB configcode elements 516 and 518 each define butterfly function blocks that, in combination, are configured to calculate a FFT. Further, in this example, the processing elements 510A and 510N are a hardware accelerators that are configured to calculate butterfly values when respectively executing the target platform FBs 522 and 524. Thus, by directly mapping the FB configcode elements directly to the target platform FBs 522 and 524, the enhanced back-end compiler 514 tailors the radio application component 512 for enhanced execution on the radio computer 500.

While this example illustrated in FIG. 5 involves direct mapping of FB configcode elements 516 and 518 to target platform FBs 522 and 524, other examples may include compression and/or extension of FB configcode elements, which are analogous to the compression and extension examples described above with reference to FIGS. 1 and 2.

Methodology for a Radio Computer

Some embodiments disclosed herein execute FB configcode extension and compression processes. In at least some of these embodiments, an enhanced back-end compiler, such as the enhanced back-end compiler 514 described above with reference to FIG. 5, references a function block map representation of a radio application component when executing these extension and/or compression processes. In some embodiments, an enhanced back-end compiler, such as the enhanced back-end compiler 514 described above with reference to FIG. 5, constructs the function block map by parsing FB configcode elements of a software component, identifying a hierarchy of APEs targeted to execute the FB configcode elements, and generating a hierarchy corresponding to the APE hierarchy that includes target platform FB that correspond to, and are executed by, the identified APEs. In some embodiments, the enhanced back-end compiler may further supplement the function block map for a specific radio application component with additional target platform FBs that are children or parents of the target platform FBs gleamed from the FB configcode. These additional target platform FBs may be, for example, target platform FBs gathered from a native radio system library and that are supported by the target platform. One example of such a function block map 700 is illustrated in FIG. 7.

Figure 7:
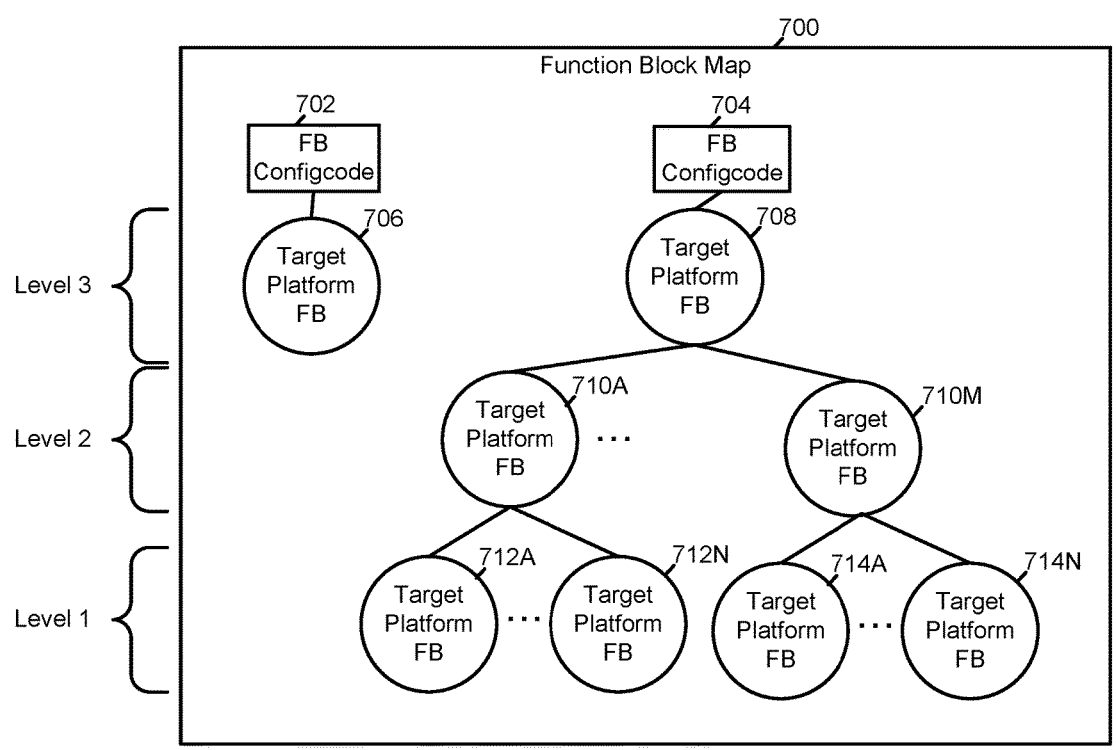
FIG. 7 is a block diagram depicting a hierarchical representation of a radio application component in accordance with an embodiment of the present disclosure.

As shown in FIG. 7, the function block map 700 includes a 3-level hierarchy. Each level of the hierarchy may represent, for example, a radio virtual machine in a nested relationship with other radio virtual machine (i.e., one way to implement hierarchy levels is to replace an APE by an RVM). For example, if configcode specifies that an APE must execute an FFT, a target platform may add one more hierarchy levels and replaces this APE by a dedicated RVM that executes, for example, butterfly operations via APEs (i.e., on the next hierarchy level). If the target platform doesn't have Butterflies, also the APEs of the second hierarchy level may be replaced by an RVM to create a third hierarchy level, i.e. each APE containing a butterfly may be replaced by an independent RVM that constructs the Butterfly operation out of atomic operations.

In the example shown in FIG. 7, the FB configcode 702 is executable at level 3 as a single target platform FB 706. In contrast, the FB configcode 704 is executable at level 3 as a single target platform FB 708, at level 2 as a collection of target platform FBs 710A through 710M, and at level 3 as a collection of target platform FBs 712A through 712N in conjunction with target platform FBs 714A through 714N. Any or all of the target platform FBs shown in FIG. 7 may be associated with both an APE of a radio virtual machine and a hardware processing element of a radio computer configured to execute the radio virtual machine. These associations may be advantageously leverage by at least some of the example compression and extension processes described herein.

Figure 8:
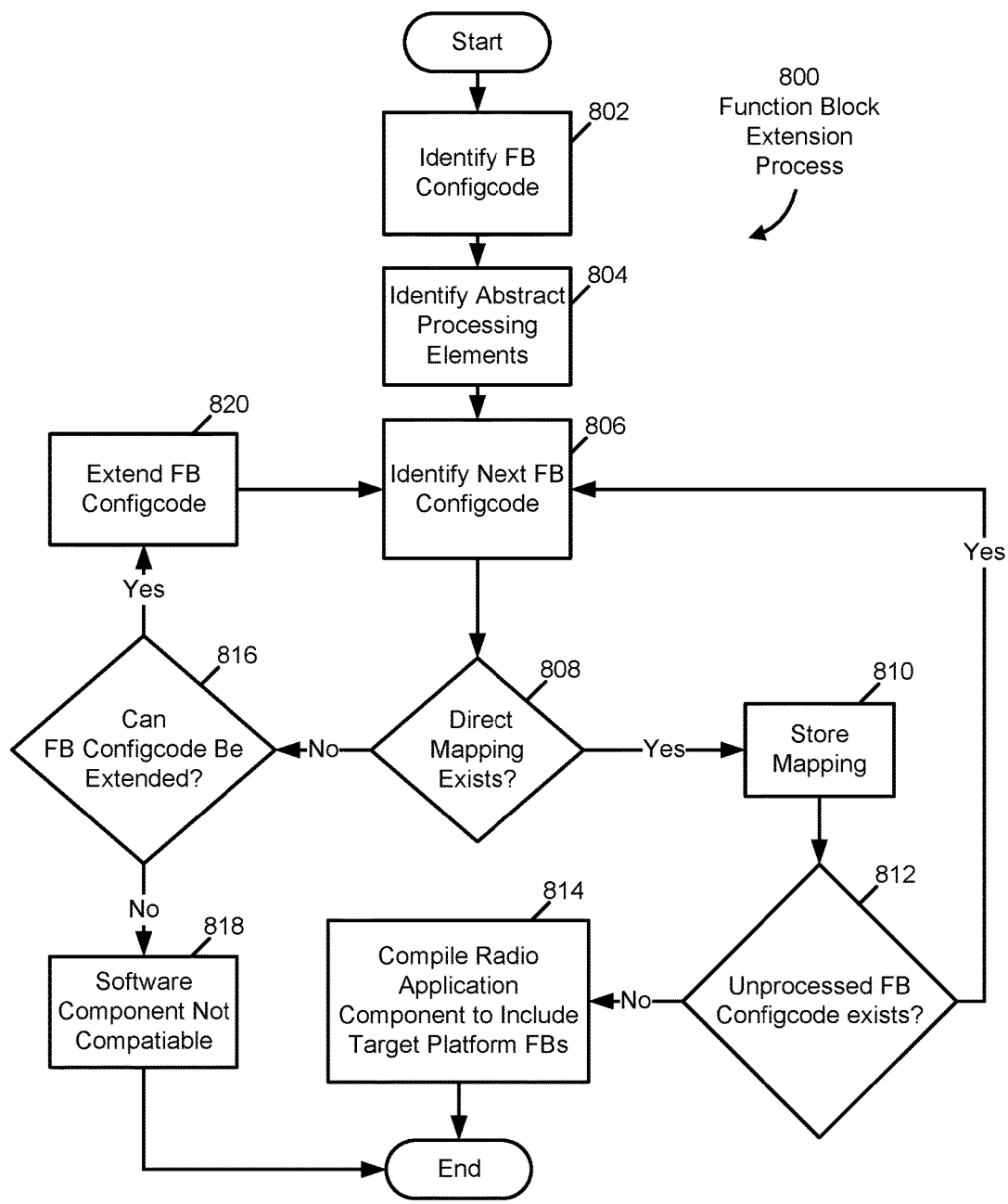
FIG. 8 is a flow chart illustrating a function block extension process in accordance with an embodiment of the present disclosure.

At least one embodiment disclosed herein executes a function block extension process, such as the function block extension process 800 illustrated in FIG. 8. The function block extension process 800 may be executed by an enhanced back-end compiler, such as the enhanced back-end compiler 514 described above with reference to FIG. 5. The function block extension process 800 may be executed as part of an overall compilation process designed to create an executable radio application component for a target hardware platform of a target radio computer, such as the radio computer 500. The acts executed by the function block extension process 800 collectively generate executable code that is tailored to the target hardware platform of the target radio computer. This tailored executable code is more efficiently executed by the target radio computer than, for example, code executed via middleware.

As illustrated in FIG. 8, the function block extension process 800 starts in act 802 with the enhanced back-end compiler identifying a set of FB configcode elements (e.g., the FB configcode elements 702 and 704) included within a radio application component. In some embodiments, the enhanced back-end compiler identifies the set of FB configcode elements by parsing and making a pass through the configcode of the radio application component. Further, in some embodiments, the enhanced back-end compiler constructs a function block map, such as the function block map 700 described above with reference to FIG. 7, within the act 802.

In act 804, the enhanced back-end compiler identifies a set of APEs within a radio virtual machine (e.g., the radio virtual machine 506) that is executable by the target radio computer. At least some of these APEs abstract one or more hardware elements (e.g., the hardware elements 504) of the radio computer. Further at least some of these APEs are associated with target platform FBs (e.g., the target platform FB 708) that are executable by one or more of processing elements of the radio computer. In some embodiments, the enhanced back-end compiler accesses configuration information descriptive of the radio virtual machine to identify the available set of APEs and/or accesses a radio native library to identify target platform FBs associated with the available set of APEs.

In act 806, the enhanced back-end compiler identifies the next, unprocessed FB configcode element (e.g., the FB configcode 708) from the set of FB configcode elements identified in the act 802 above. In act 808, the enhanced back-end compiler determines whether the identified FB configcode element maps directly to (i.e., is executable by) one of the APEs within the set of APEs identified in the act 804. If so, the enhanced back-end compiler executes act 810. Otherwise, the enhanced compiler executes act 816.

In the act 816, the enhanced back-end compiler determines whether the identified FB configcode element can be extended to include one or more lower level FB configcode elements that are executable by one or more APEs available within the radio virtual machine. For instance, in one embodiment, the enhanced back-end compiler makes this determination by attempting to identify one or more APEs (e.g., APEs associated with target platform FBs 710A through 710M) from the set of APEs identified in the act 804 that can collectively execute the identified FB configcode element (e.g., the FB configcode 708). Where the function block map is available, the enhanced back-end compiler determines whether the FB configcode element can be extended by identifying, within the function block map, a target platform FB corresponding to the identified FB configcode element and determining whether children of the target platform FB are collectively executable by a set of APEs identified in the act 804. If the enhanced back-end compiler determines that the FB configcode element can be extended, the enhanced back-end compiler executes act 820. Otherwise, the enhanced back-end compiler executes act 818.

In the act 820, the enhanced back-end compiler extends the identified FB configcode element by replacing the FB configcode element (e.g., the FB configcode 708) with one or more other FB configcode elements (e.g., FB configcode elements associated with target platform FBs 710A through 710M) that are executable by the one or more APEs identified in the act 816. These one or more other FB configcode elements are then subject to processing by the act 806 and will be directly mapped to the one or more APEs via execution of the act 808.

In act 810, the enhanced back-end compiler stores the mapping identified in the act 808 for subsequent processing in act 814. In act 812, the enhanced back-end compiler determines whether unprocessed members of the set of FB configcode elements identified in the act 802 exist. If so, the enhanced back-end compiler executes the act 806 to identify the next unprocessed member of the set of FB configcode elements. Otherwise, the enhance compiler executes the act 814.

In the act 814, the enhanced back-end compiler compiles the radio application component and includes a set of target platform FBs associated with the APEs included in the mappings stored in the act 810. After execution of the act 814, the function block extension process 800 ends.

In the act 818, the enhanced back-end compiler determines that the radio application component being compiled is not compatible with the target platform due to lack of support for the identified FB configcode, and the function block extension process 800 ends.

Figure 9:
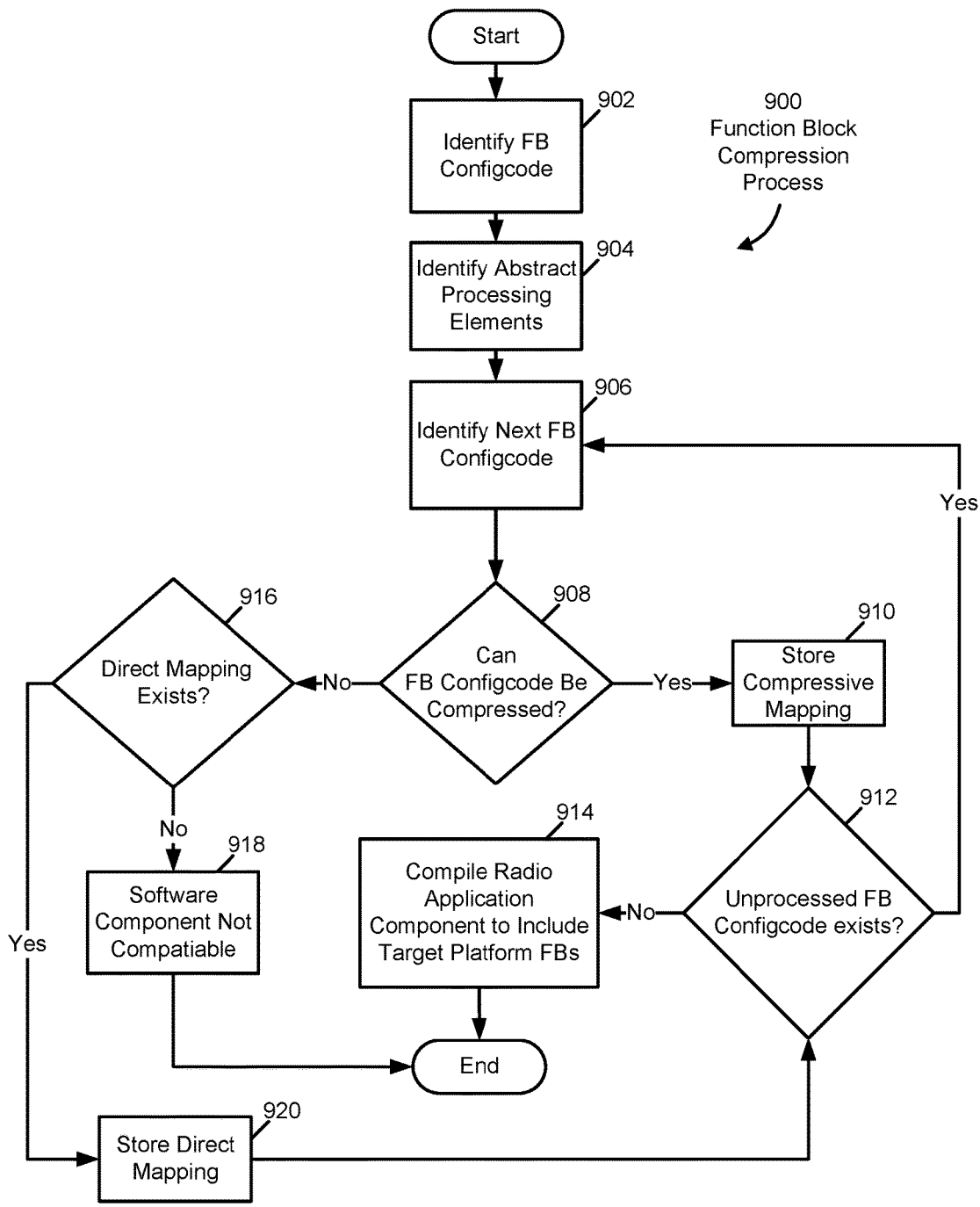
FIG. 9 is a flow chart illustrating another function block compression process in accordance with an embodiment of the present disclosure.

At least one embodiment disclosed herein executes a function block compression process, such as the function block compression process 900 illustrated in FIG. 9. The function block compression process 900 may be executed by an enhanced back-end compiler, such as the enhanced back-end compiler 514 described above with reference to FIG. 5. The function block compression process 900 may be executed as part of an overall compilation process designed to create an executable radio application component for a target hardware platform of a target radio computer, such as the radio computer 500. The acts executed by the function block compression process 900 collectively generate executable code that is tailored to the target hardware platform of the target radio computer. This tailored executable code is more efficiently executed by the target radio computer than, for example, code executed via middleware.

As illustrated in FIG. 9, the function block compression process 900 starts in act 902 with the enhanced back-end compiler identifying a set of FB configcode elements (e.g., the FB configcode elements 702 and 704) included within a radio application component. In some embodiments, the enhanced back-end compiler identifies the set of FB configcode elements by parsing and making a pass through the configcode of the radio application component.

In act 904, the enhanced back-end compiler identifies a set of APEs within a radio virtual machine (e.g., the radio virtual machine 506) that is executable by the target radio computer. At least some of these APEs abstract one or more hardware elements (e.g., the hardware elements 504) of the radio computer. Further at least some of these APEs are associated with target platform FBs (e.g., the target platform FBs 710A through 710M) that are executable by one or more of processing elements of the radio computer. In some embodiments, the enhanced back-end compiler accesses configuration information descriptive of the radio virtual machine to identify the available set of APEs and/or accesses a radio native library to identify target platform FBs associated with the available set of APEs. Further, in some embodiments, the enhanced back-end compiler constructs a function block hierarchy, such as the function block hierarchy 700 described above with reference to FIG. 7, within the act 904.

In act 906, the enhanced back-end compiler identifies the next, unprocessed FB configcode element (e.g., an FB configcode element associated with target platform FB 710A) from the set of FB configcode elements identified in the act 902 above. In act 908, the enhanced back-end compiler determines whether the identified FB configcode element can be compressed with one or more other FB configcode elements (e.g., FB configcode elements associated with target platform FBs 710B through 710M) to generate a higher level FB configcode element (e.g., an FB configcode element associated with target platform FB 708) that is executable by a higher level APE. For instance, in one embodiment, the enhanced back-end compiler makes this determination by attempting to identify one APE from the set of APEs identified in the act 904 that can execute the identified FB configcode element and one or more other unprocessed FB configcode elements. Where the function block map is available, the enhanced back-end compiler determines whether the FB configcode element can be compressed by identifying, within the function block map, a target platform FB corresponding to the identified FB configcode element, determining whether the target platform FB has a parent, and determining whether the parent is executable by an APE identified in the act 904. If the enhanced back-end compiler determines that the FB configcode element can be compressed, the enhanced back-end compiler executes act 910. Otherwise, the enhanced back-end compiler executes act 916.

In act 910, the enhanced back-end compiler stores, for subsequent processing in act 914, a compressive mapping that identifies the APE, the identified FB configcode element, and the one or more other unprocessed FB configcode elements identified in the 908. In act 912, the enhanced back-end compiler determines whether unprocessed members of the set of FB configcode elements identified in the act 902 exist. If so, the enhanced back-end compiler executes the act 906 to identify the next unprocessed member of the set of FB configcode elements. Otherwise, the enhance compiler executes the act 914.

In act 916, the enhanced back-end compiler determines whether the identified FB configcode element maps directly to (i.e., is executable by) one of the APEs within the set of APEs identified in the act 904. If so, the enhanced back-end compiler executes act 920. Otherwise, the enhanced compiler executes act 918. In the act 920, the enhanced back-end compiler stores, for subsequent processing in act 914, a direct mapping that identifies the APE and the identified FB configcode element.

In the act 914, the enhanced back-end compiler compiles the radio application component and includes a set of target platform FBs associated with the APEs included in the mappings stored in the acts 910 and 920. As part of this compilation process in some embodiments, the enhanced back-end compiler replaces compressed FB configcode elements with higher level FB configcode elements identified in the mappings store in the act 910. After execution of the act 914, the function block compression process 900 ends.

In the act 918, the enhanced back-end compiler determines that the radio application component being compiled is not compatible with the target platform due to lack of support for the identified FB configcode, and the function block compression process 900 ends.

Processes 800 and 900 each depict one particular sequence of acts in a particular example. The acts included in these processes may be performed by, or using, one or more computing devices specially configured as discussed herein. Some acts are optional and, as such, may be omitted in accord with one or more examples. Additionally, the order of acts can be altered, or other acts can be added, without departing from the scope of the systems and methods discussed herein.

Computing Device

Figure 10:
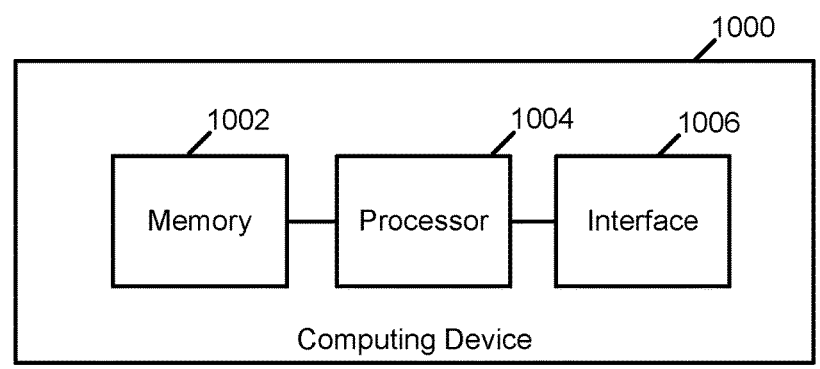
FIG. 10 is a block diagram of a computing device that may implement various function and function block mapping processes in accordance with an embodiment of the present disclosure.

FIG. 10 illustrates a computing device 1000 that can be used to implement various components as described herein. As shown, the computing device 1000 includes memory 1002, at least one processor 1004, and at least one interface 1006. Although the particular types and models of these components may vary between computing devices, it is appreciated that each computing device includes a processor, memory, and an interface.

The interface 1006 includes one or more physical interface devices such as input devices, output devices, and combination input/output devices and a software stack configured to drive operation of the devices. Interface devices may receive input or provide output. More particularly, output devices may render information for external presentation and input devices may accept or generate information from external sources. Examples of interface devices include keyboards, mouse devices, trackballs, microphones, touch screens, printing devices, display screens, speakers, network interface cards, environmental sensors, and the like. Interface devices allow programmable devices to exchange information and communicate with external entities, such as users and other systems.

The memory 1002 includes volatile and/or non-volatile (i.e., non-transitory or non-transient) data storage that is readable and/or writeable by the processor 1004. The memory 1002 stores programs and data used or manipulated during operation of the computing device 1000. The programs stored in the memory 1002 are a series of instructions that are executable by the at least one processor 1004. The memory 1002 may include relatively high performance data storage, such as registers, caches, dynamic random access memory, and static memory. The memory 1002 may further include a relatively low performance, non-volatile, computer readable and/or writable data storage medium such as flash memory or an optical or magnetic disk. Various embodiments may organize the memory 1002 into particularized and, in some cases, unique structures to store data in support of the components disclosed herein. These data structures may be specifically configured to conserve storage space or increase data exchange performance and may be sized and organized to store values for particular data and types of data.

To implement and/or control specialized components in some embodiments, the processor 1004 executes a series of instructions (i.e., one or more programs) that result in manipulated data. The processor 1004 may be any type of processor, multiprocessor, microprocessor, or controller known in the art. The processor 1004 is connected to and communicates data with the memory 1002 and the interfaces 1006 via an interconnection mechanism, such as a bus or some other data connection. This interconnection mechanism is represented in FIG. 10 by lines connecting the components within the computing device. In operation, the processor 1004 causes data and/or encoded instructions to be read from a non-volatile data storage medium in the memory 1002 and written to high performance data storage. The processor 1004 manipulates the data and/or executes the encoded instructions within the high-performance data storage and copies the manipulated data to the data storage medium after processing is completed.

Although the computing device 1000 is shown as an example of a computing device capable of executing the processes disclosed herein, embodiments are not limited to the computing device shown in FIG. 10. For example, various processes may be executed by one or more computing devices having a different architectures or components than those shown in FIG. 10. For instance, a programmable device may include specially programmed, special-purpose hardware, such as an application-specific integrated circuit (ASIC), a field-programmable gate array (FPGA), a complex programmable logic device (CPLD), and other implementations in silicon or other hardware tailored to execute processes disclosed herein. Thus, components of a computing device as disclosed herein may be implemented in software, hardware, firmware, or any combination thereof.

For example, as described above, the processor 1004 may be general purpose processor. However, when executing a specific software process as described herein (e.g., as depicted in any of FIGS. 4, 8, and/or 9), the processor 1004 becomes a special purpose processor capable of making specific logic-based determinations based on input data received, and further capable of providing one or more outputs that can be used to control or otherwise inform subsequent processing to be carried out by the processor 1004 and/or other processors or circuitry with which processor 1004 is communicatively coupled. The processor 1004 reacts to specific input stimulus in a specific way and generates a corresponding output based on that input stimulus. In this sense, the structure of processor 1004 according to one embodiment is defined by the processes shown in any of FIGS. 4, 8, and/or 9. Moreover, in some example cases, the processor 1004 proceeds through a sequence of logical transitions in which various internal register states and/or other bit cell states internal or external to the processor 1004 may be set to logic high or logic low. This specific sequence of logic transitions is determined by the state of electrical input signals to the processor 1004 and a special-purpose structure is effectively assumed by the processor 1004 when executing each software instruction of the processes shown in FIGS. 4, 8 and/or 9. Specifically, those instructions anticipate the various stimulus to be received and change the implicated memory states accordingly. In this way, the processor 1004 may generate and store or otherwise provide useful output signals. Thus, it is appreciated that the processor 1004, during execution of a software process becomes a special purpose machine, capable of processing only specific input signals and rendering specific output signals based on the one or more logic operations performed during execution of each instruction. In at least some examples, the processor 1004 is configured to execute a function where software is stored in a data storage device coupled with the processor 1004 (e.g., the memory 1002) and that software is configured to cause the processor 1004 to proceed through a sequence of various logic operations that result in the function being executed.

Further Example Embodiments

Besides cellular applications, specific applications of some embodiments for vertical markets include PMSE (Program Making and Special Events), medical, health, surgery, automotive, low-latency, drones, etc. applications. For example, some embodiments are directed to smartphone reconfiguration. Conventional smartphone applications provide new tools or games to the end-user without altering any radio parameters. However, at least some embodiments disclosed herein provide a framework for introducing Radio-Apps, e.g. applications which extend or modify existing radio features and define solutions for technical, certification and security needs. Such RadioApps may optimize the operation of a smartphone in general and/or for usage in a specific market with special needs. For instance, RadioApps may be used to generally optimize the operation of a smartphone in response to the introduction of new features on the network side. The optimum configuration may be identified (e.g., new power-efficient Modulation and Coding schemes, etc.) to meet power efficiency, predictable QoS, and other requirements. RadioApps may also optimize a smartphone for a specific industrial environment. Beyond provisioning of additional modules, the embodiments disclosed herein allow for the replacement of entire RATs where sufficient computational resources are available.

Other embodiments are directed to automotive applications. These embodiments may be used in conjunction with Vehicle-to-Everything (V2X) communications, including Vehicle-to-Vehicle (V2V), Vehicle-to-Infrastructure (V2I), etc. The challenges that are addressed by embodiments in this area include security and obsolesce where a radio communications component must remain relevant and secure over the entire life-time of a vehicle, i.e. 10 years and beyond. To address the obsolesce concern, the embodiments disclosed herein enable manufacturers to replace specific software while maintaining power efficient products and thus maintain related feature-sets up-to-date without requiring changes to the hardware.

To address the security concern, the embodiments disclosed herein can be used to bypass previously designed components for which a vulnerability is emerged. For this reason, it is sufficient to complement the original design (e.g., ASIC based design) with some computational/reconfigurable resources (such as FPGA resources, DSP resources, memory resources, etc.). Once a vulnerability is detected in one of the original components (e.g., an encryption/decryption module), this component is de-activated and replaced by an updated design to be executed on the reconfigurable (FPGS/DSP/etc.) resources. This updated design is typically provided as a Software Component which interfaces with manufacturer provided APIs which link the new components to the inputs/outputs of the component to be replaced.

Other embodiments are directed to Internet-of-Things applications. These embodiments may be used in conjunction with 5G networks to provide needed flexibility to for gaming, voice communication, medical applications, industrial automation, etc. Each of these vertical applications has its particular needs in terms of features, form factors, etc. Due to large number of possible configurations needed, it is unlikely that manufactures will offer tailored components for each of the vertical applications. Rather, a limited number of generic and reconfigurable components will be made available which are suitably tailored to the target market through software components. The embodiments disclosed herein can be used to tailor these software components to the particular target platforms to conserve power and increase computational efficiency and overall device performance.

The following examples pertain to further embodiments, from which numerous permutations and configurations will be apparent.

Example 1 is a computing device comprising a memory and at least one processor coupled to the memory. The at least one processor is configured to receive a software component comprising one or more radio virtual machine function calls to execute a function; identify a target platform to execute the software component, the target platform including one or more hardware processing elements configured to execute the function; determine that the one or more radio virtual machine function calls invoke hardware processing elements other than the one or more hardware processing elements; and replace the one or more radio virtual machine function calls with one or more target platform function calls that invoke the one or more hardware processing elements to execute the function.

Example 2 includes the subject matter of Example 1, wherein the one or more radio virtual machine function calls include a single radio virtual machine function call, the one or more target platform function calls include a plurality of target platform function calls, and the at least one processor is further configured to extend the single radio virtual machine function call into the plurality target platform function calls.

Example 3 includes the subject matter of Example 2, wherein the at least one processor is configured to extend the single radio virtual machine function call at least in part by identifying a single target platform function call to execute the function; identifying an association between the single target platform function call and the plurality of target platform function calls; and replacing the single radio virtual machine function call with the plurality of target platform function calls.

Example 4 includes the subject matter of Example 3, wherein the memory stores a hierarchy that associates the single target platform function call with the plurality of target platform function calls and the at least one processor is configured to identify the association at least in part by accessing the hierarchy.

Example 5 includes the subject matter of any of Examples 1 through 4, wherein the one or more radio virtual machine function calls include a plurality of radio virtual machine function calls, the one or more target platform function calls include a single target platform function call, and the at least one processor is further configured to compress the plurality of radio virtual machine function calls into the single target platform function.

Example 6 includes the subject matter of Example 5, wherein the at least one processor is configured to compress the plurality of radio virtual machine function calls at least in part by identifying a plurality of target platform function calls to execute the function collectively; identifying an association between the plurality of target platform function calls and the single target platform function call; and replacing the plurality radio virtual machine function calls with the single target platform function call.

Example 7 includes the subject matter of Example 6, wherein the memory stores a hierarchy that associates the plurality of target platform function calls with the single target platform function call and the at least one processor is configured to identify the association at least in part by accessing the hierarchy.

Example 8 includes the subject matter of any of Examples 1 through 7, wherein the function is a Fast Fourier Transform.

Example 9 includes the subject matter of any of Examples 1 through 8, wherein the at least one processor is further configured to identify the one or more target platform function calls at least in part by accessing a radio native library for the target platform.

Example 10 includes the subject matter of any of Examples 1 through 9, wherein the computing device includes a radio computer.

Example 11 includes the subject matter of any of Examples 1 through 10, wherein the computing device is a smartphone comprising an antenna, touch screen, and speaker.

Example 12 is a method of adapting software to a target platform. The method comprises receiving a software component comprising one or more radio virtual machine function calls to execute a function; identifying the target platform to execute the software component, the target platform including one or more hardware processing elements configured to execute the function; determining that the one or more radio virtual machine function calls invoke hardware processing elements other than the one or more hardware processing elements; and replacing the one or more radio virtual machine function calls with one or more target platform function calls that invoke the one or more hardware processing elements to execute the function.

Example 13 includes the subject matter of Example 12, wherein the one or more radio virtual machine function calls include a single radio virtual machine function call, the one or more target platform function calls include a plurality of target platform function calls, and the method further comprises extending the single radio virtual machine function call into the plurality target platform function calls.

Example 14 includes the subject matter of Example 13, wherein extending the single radio virtual machine function call comprises identifying a single target platform function call to execute the function; identifying an association between the single target platform function call and the plurality of target platform function calls; and replacing the single radio virtual machine function call with the plurality of target platform function calls.

Example 15 includes the subject matter of Example 14, wherein identifying the association comprises accessing a hierarchy stored in memory that associates the plurality of target platform function calls with the single target platform function call.

Example 16 includes the subject matter of any of Examples 12 through 15, wherein the one or more radio virtual machine function calls include a plurality of radio virtual machine function calls, the one or more target platform function calls include a single target platform function call, and the method further comprises compressing the plurality of radio virtual machine function calls into the single target platform function call.

Example 17 includes the subject matter of Example 16, wherein compressing the plurality of radio virtual machine function calls comprises identifying a plurality of target platform function calls to execute the function collectively; identifying an association between the plurality of target platform function calls and the single target platform function call; and replacing the plurality radio virtual machine function calls with the single target platform function call.

Example 18 includes the subject matter of Example 17, wherein identifying the association comprises accessing hierarchy stored in memory that that associates the single target platform function call with the plurality of target platform function calls.

Example 19 includes the subject matter of any of Examples 12 through 18, wherein receiving the software component comprises receiving a software component comprising one or more radio virtual machine function calls to execute a Fast Fourier Transform.

Example 20 includes the subject matter of any of Examples 12 through 19, further comprising identifying the one or more target platform function calls at least in part by accessing a radio native library for the target platform.

Example 21 includes the subject matter of any of Examples 12 through 20, wherein identifying the target platform includes identifying a radio computer.

Example 22 is a non-transient computer readable medium encoded with instructions that when executed by one or more processors cause a process of adapting software to a target platform to be carried out. The process comprises receiving a software component comprising one or more radio virtual machine function calls to execute a function; identifying the target platform to execute the software component, the target platform including one or more hardware processing elements configured to execute the function; determining that the one or more radio virtual machine function calls invoke hardware processing elements other than the one or more hardware processing elements; and replacing the one or more radio virtual machine function calls with one or more target platform function calls that invoke the one or more hardware processing elements to execute the function.

Example 23 includes the subject matter of Example 22, wherein the one or more radio virtual machine function calls include a single radio virtual machine function call, the one or more target platform function calls include a plurality of target platform function calls, and the process further comprises extending the single radio virtual machine function call into the plurality target platform function calls.

Example 24 includes the subject matter of Example 23, wherein extending the single radio virtual machine function call comprises identifying a single target platform function call to execute the function; identifying an association between the single target platform function call and the plurality of target platform function calls; and replacing the single radio virtual machine function call with the plurality of target platform function calls.

Example 25 includes the subject matter of Example 24, wherein the memory stores a hierarchy and identifying the association comprises accessing the hierarchy.

Example 26 includes the subject matter of any of Examples 22 through 25, wherein the one or more radio virtual machine function calls include a plurality of radio virtual machine function calls, the one or more target platform function calls include a single target platform function call, and the process further comprises compressing the plurality of radio virtual machine function calls into the single target platform function call.

Example 27 includes the subject matter of Example 26, wherein compressing the plurality of radio virtual machine function calls comprises identifying a plurality of target platform function calls to execute the function collectively; identifying an association between the plurality of target platform function calls and the single target platform function call; and replacing the plurality radio virtual machine function calls with the single target platform function call.

Example 28 includes the subject matter of Example 27, wherein the memory stores a hierarchy that associates the single target platform function call with the plurality of target platform function calls and identifying the association comprises accessing the hierarchy.

Example 29 includes the subject matter of any of Examples 22 through 28, wherein receiving the software component comprises receiving a software component comprising one or more radio virtual machine function calls to execute a Fast Fourier Transform.

Example 30 includes the subject matter of any of Examples 22 through 29, further comprising identifying the one or more target platform function calls at least in part by accessing a radio native library for the target platform.

Example 31 includes the subject matter of any of Examples 22 through 30, wherein identifying the target platform includes identifying a radio computer.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

Additionally, while the bulk of this specification illustrates embodiments including enhanced compilers and enhanced back-end compilers that are disposed upon devices that execute software components compiled by the enhanced compilers and enhanced back-end compilers, the embodiments disclosed herein are not limited to this configuration. In other embodiments, enhanced compilers and enhanced back-end compilers are disposed upon and executed by devices distinct and, in some instances remote, from the devices which execute the software component.

The invention claimed is:

1. A computing device comprising:
   a memory; and
   at least one processor coupled to the memory and configured to:
      receive a software component comprising one or more radio virtual machine function calls configured to execute an operation;
      identify a target platform to execute the software component, the target platform including a first set of one or more hardware processing elements configured to execute the operation and a second set of one or more hardware processing elements, the first set being different than the second set;
      determine that the one or more radio virtual machine function calls are configured to invoke at least one of the one or more hardware processing elements of the second set;
      replace the one or more radio virtual machine function calls with one or more target platform function calls configured to invoke the at least one of the one or more hardware processing elements of the second set to execute the operation; and
      execute the one or more target platform function calls with the at least one of the one or more hardware processing elements of the second set.

2. The computing device of claim 1, wherein the one or more radio virtual machine function calls include a single radio virtual machine function call, the one or more target platform function calls include a plurality of target platform function calls, and the at least one processor is further configured to extend the single radio virtual machine function call into the plurality of target platform function calls.

3. The computing device of claim 2, wherein the at least one processor is configured to extend the single radio virtual machine function call at least in part by:
   identifying a single target platform function call to execute the operation;
   identifying an association between the single target platform function call and the plurality of target platform function calls; and
   replacing the single radio virtual machine function call with the plurality of target platform function calls.

4. The computing device of claim 3, wherein the memory stores a hierarchy that associates the single target platform function call with the plurality of target platform function calls and the at least one processor is configured to identify the association at least in part by accessing the hierarchy.

5. The computing device of claim 1, wherein the one or more radio virtual machine function calls include a plurality of radio virtual machine function calls, the one or more target platform function calls include a single target platform function call, and the at least one processor is further configured to compress the plurality of radio virtual machine function calls into the single target platform function call.

6. The computing device of claim 5, wherein the at least one processor is configured to compress the plurality of radio virtual machine function calls at least in part by:
   identifying a plurality of target platform function calls to execute the operation collectively;
   identifying an association between the plurality of target platform function calls and the single target platform function call; and
   replacing the plurality radio virtual machine function calls with the single target platform function call.

7. The computing device of claim 6, wherein the memory stores a hierarchy that associates the plurality of target platform function calls with the single target platform function call and the at least one processor is configured to identify the association at least in part by accessing the hierarchy.

8. The computing device of claim 1, wherein the operation is a Fast Fourier Transform.

9. The computing device of claim 1, wherein the at least one processor is further configured to identify the one or more target platform function calls at least in part by accessing a radio native library for the target platform.

10. The computing device of claim 1, wherein the computing device includes a radio computer.

11. The computing device of claim 1, wherein the computing device is a smartphone comprising an antenna, touch screen, and speaker.

12. A method of adapting software to a target platform, the method comprising:
   receiving a software component comprising one or more radio virtual machine function calls configured to execute an operation;
   identifying the target platform to execute the software component, the target platform including a first set of one or more hardware processing elements configured to execute the operation and a second set of one or more hardware processing elements, the first set being different than the second set;

determining that the one or more radio virtual machine function calls are configured to invoke at least one of the one or more hardware processing elements of the second set;

replacing the one or more radio virtual machine function calls with one or more target platform function calls configured to invoke the at least one of the one or more hardware processing elements of the second set to execute the operation; and executing the one or more target platform function calls with the at least one of the one or more hardware processing elements of the second set.

13. The method of claim 12, wherein the one or more radio virtual machine function calls include a single radio virtual machine function call, the one or more target platform function calls include a plurality of target platform function calls, and the method further comprises extending the single radio virtual machine function call into the plurality of target platform function calls.

14. The method of claim 13, wherein extending the single radio virtual machine function call comprises:
identifying a single target platform function call to execute the operation;
identifying an association between the single target platform function call and the plurality of target platform function calls; and
replacing the single radio virtual machine function call with the plurality of target platform function calls.

15. The method of claim 14, wherein identifying the association comprises accessing a hierarchy stored in memory that associates the single target platform function call with the plurality of target platform function calls.

16. The method of claim 12, wherein the one or more radio virtual machine function calls include a plurality of radio virtual machine function calls, the one or more target platform function calls include a single target platform function call, and the method further comprises compressing the plurality of radio virtual machine function calls into the single target platform function call.

17. The method of claim 16, wherein compressing the plurality of radio virtual machine function calls comprises:
identifying a plurality of target platform function calls to execute the operation collectively;
identifying an association between the plurality of target platform function calls and the single target platform function call; and
replacing the plurality radio virtual machine function calls with the single target platform function call.

18. The method of claim 17, wherein identifying the association comprises accessing a hierarchy stored in memory that associates the plurality of target platform function calls with the single target platform function call.

19. The method of claim 12, further comprising identifying the one or more target platform function calls at least in part by accessing a radio native library for the target platform.

20. A non-transitory computer readable medium encoded with instructions that when executed by one or more processors cause a process of adapting software to a target platform to be carried out, the process comprising:
receiving a software component comprising one or more radio virtual machine function calls configured to execute an operation;

identifying the target platform to execute the software component, the target platform including a first set of one or more hardware processing elements configured to execute the operation and a second set of one or more hardware processing elements, the first set being different than the second set;

determining that the one or more radio virtual machine function calls are configured to invoke at least one of the one or more hardware processing elements of the second set;

replacing the one or more radio virtual machine function calls with one or more target platform function calls configured to invoke the at least one of the one or more hardware processing elements of the second set to execute the operation; and executing the one or more target platform function calls with the at least one of the one or more hardware processing elements of the second set.

21. The non-transitory computer readable medium of claim 20, wherein the one or more radio virtual machine function calls include a single radio virtual machine function call, the one or more target platform function calls include a plurality of target platform function calls, and the process further comprises extending the single radio virtual machine function call into the plurality of target platform function calls.

22. The non-transitory computer readable medium of claim 21, wherein extending the single radio virtual machine function call comprises:
identifying a single target platform function call to execute the operation;
identifying an association between the single target platform function call and the plurality of target platform function calls; and
replacing the single radio virtual machine function call with the plurality of target platform function calls.

23. The non-transitory computer readable medium of claim 22, wherein identifying the association comprises accessing a hierarchy stored in memory that associates the single target platform function call with the plurality of target platform function calls.

24. The non-transitory computer readable medium of claim 20, wherein the one or more radio virtual machine function calls include a plurality of radio virtual machine function calls, the one or more target platform function calls include a single target platform function call, and the process further comprises compressing the plurality of radio virtual machine function calls into the single target platform function call.

25. The non-transitory computer readable medium of claim 24, wherein compressing the plurality of radio virtual machine function calls comprises:
identifying a plurality of target platform function calls to execute the operation collectively;
identifying an association between the plurality of target platform function calls and the single target platform function call; and
replacing the plurality radio virtual machine function calls with the single target platform function call.

26. The non-transitory computer readable medium of claim 20, further comprising identifying the one or more target platform function calls at least in part by accessing a radio native library for the target platform.

* * * * *